United States Patent
Kimura

(10) Patent No.: US 8,400,899 B2
(45) Date of Patent: Mar. 19, 2013

(54) OPTICAL PICKUP DEVICE WITH DETECTION OPTICAL SYSTEM

(75) Inventor: Shigeharu Kimura, Yokohama (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 58 days.

(21) Appl. No.: 13/099,404

(22) Filed: May 3, 2011

(65) Prior Publication Data

US 2011/0292778 A1   Dec. 1, 2011

(30) Foreign Application Priority Data

May 28, 2010  (JP) ................................ 2010-123112

(51) Int. Cl.
*G11B 7/00* (2006.01)
(52) U.S. Cl. ............................... 369/112.12; 369/44.37
(58) Field of Classification Search .................. None
See application file for complete search history.

(56) References Cited

U.S. PATENT DOCUMENTS

| | | | |
|---|---|---|---|
| 2010/0214902 A1* | 8/2010 | Nakano et al. | 369/112.03 |
| 2011/0063956 A1* | 3/2011 | Yamazaki | 369/44.11 |
| 2012/0002532 A1* | 1/2012 | Yamazaki et al. | 369/112.03 |

OTHER PUBLICATIONS

Hartmut Richter et al., System Aspects of Dual-Layer Phase-Change Recording with High Numerical Aperture Optics and Blue Laser, Jpn. J. Appl. Phys., Feb. 2003, pp. 956-960, vol. 42, Part 1, No. 2B.
Shigeharu Kimura et al., Use of Grating in reading multi-layer disc to reduce amount of interlayer cross-talk, TD05-155 (1).
Kousei Sano et al., Novel One-Beam Tracking Detection Method for Dual-Layer Blu-ray Discs, Japanese Journal of Applied Physics, 2006, pp. 1174-1177, vol. 45, No. 2B.

* cited by examiner

*Primary Examiner* — Paul Huber
(74) *Attorney, Agent, or Firm* — Antonelli, Terry, Stout & Kraus, LLP.

(57) ABSTRACT

A tracking signal and a focusing signal are stabilized by eliminating multi-layer crosstalk. The diffraction position, with respect to a semiconductor detector, from a center region of a multi-region diffraction grating disposed along the return path of reflection light from the layer of interest is placed further away from the optical axis than the diffraction position from a peripheral part of the diffraction grating. Stray light from other layers is thus prevented from being incident on a sensing region for a peripheral region of the diffraction grating. Further, the area of the semiconductor detector is reduced by dividing the center region.

8 Claims, 15 Drawing Sheets

OPTICAL PICKUP DEVICE WITH DETECTION OPTICAL SYSTEM

CLAIM OF PRIORITY

The present application claims priority from Japanese patent application JP 2010-123112 filed on May 28, 2010, the content of which is hereby incorporated by reference into this application.

BACKGROUND OF THE INVENTION

1. Field of the Invention

The present invention relates to optical pickup devices, and more particularly to read optical systems of optical pickup devices.

2. Background Art

The storage capacity of one layer of an optical disc is largely dependent on the wavelength of the semiconductor laser used and the numerical aperture (NA) of the objective lens. The shorter the wavelength of the semiconductor laser or the greater the NA, the greater the recording density can be made, and the more the capacity per layer can be increased. Optical disc drives currently on the market are mainly DVD (Digital Versatile Disc) drives that use red light of a wavelength in the vicinity of 650 nm and an objective lens with an NA of 0.6. However, as optical disc drives with recording densities surpassing those of DVDs, ones that have a blue-violet semiconductor laser of a wavelength in the vicinity of 405 nm as a light source and use an objective lens with an NA of 0.85 are also being shipped. As a method of further increasing currently achieved recording densities, one may contemplate shortening the wavelength used. However, difficulties are anticipated with respect to developing a semiconductor laser in the ultraviolet range, which is shorter than the aforementioned blue-violet, in addition to which degradation of polycarbonate disc substrates due to ultraviolet light is also anticipated. Further, with respect to increasing the NA of objective lenses, since the NA of objective lenses in air has a limit of 1, improving recording densities by way of the NA of objective lenses is also becoming difficult.

Under such circumstances, as a method of increasing the capacity of a single optical disc, the provision of dual layers is practiced. In Jpn. J. Appl. Phys., Vol. 42 (2003), pp. 956-960 (Non-Patent Document 1), a dual-layer phase change disc technology is presented. When a dual-layer optical disc is irradiated with laser light, the adjacent layer is simultaneously irradiated, and inter-layer crosstalk consequently becomes a problem. In order to mitigate this problem, inter-layer spacing is increased. Since laser light is focused, and layers other than the target layer (layer of interest) are offset from the focal plane of the laser light, crosstalk can be reduced.

On the other hand, when inter-layer spacing is widened, spherical aberration becomes a problem. The recording layer is embedded in polycarbonate whose refractive index is different from that of air, and its spherical aberration varies depending on the depth from the disc surface. The objective lens is designed in such a manner that its spherical aberration decreases for a given layer, and when the focal point of the laser light is moved to another layer, since the distance of the focal position from the surface is different, spherical aberration occurs. This aberration may be corrected by placing an expander lens optical system, which typically comprises two lenses, or a liquid crystal element before the objective lens. In other words, aberration may be corrected by varying the distance of the two lenses or the phase of the liquid crystal element. However, given that a certain compensatable range of the liquid crystal element or a movement mechanism for the lenses is to be realized within a small optical disc drive device, correcting a large spherical aberration proves difficult.

If multiple layers were to be provided in order to further increase capacity, the overall thickness of the multiple layers would be restricted due to the correction limit for spherical aberration. Thus, if there are many layers, inter-layer spacing becomes narrower. As a result, in actual multi-layer optical drive devices, inter-layer crosstalk would remain.

In order to reduce such crosstalk, ISOM/ODS '08, Technical Digest Post-deadline Papers, TD05-155 (2008) (Non-Patent Document 2) describes the use of the fact that when the reflection light from a multi-layer optical disc is focused with a lens, the respective focal positions of the reflection light from the target layer and the reflection light from the adjacent layer vary along the optical axis. Specifically, a grating is so disposed as to include the optical axis, and a reflecting mirror is disposed in the focal plane of the reflection light from the layer of interest. The reflection light from the adjacent layer is attenuated since it irradiates the grating. On the other hand, the reflection light from the layer of interest travels through the gap between the grating and the reflecting mirror. Consequently, it is able to return to a detection system without being attenuated. Thus, it becomes possible to reduce inter-layer crosstalk.

In addition, in Jpn. J. Appl. Phys., Vol. 45, No. 2B (2006), pp. 1174-1177 (Non-Patent Document 3), a tracking signal is obtained using one beam, and stray light from dual layers is prevented from affecting the tracking signal. By adopting a configuration in which the light at the center part of a grating disposed in the return path is detected at a place off the optical axis, stray light is prevented from being incident on a quadrant detector for detecting tracking signals disposed near the optical axis center.

SUMMARY OF THE INVENTION

Crosstalk caused by a multi-layer optical disc with respect to the detection optical system of an optical pickup device will be described with reference to FIG. 21. Here, it is assumed that a PP (Push-Pull) method is used for the detection of a tracking error signal, and that an astigmatic method is used for the detection of a focus error signal. For purposes of brevity, it is assumed that an optical disc 501 is a dual-layer optical disc, and that layers 511 and 512 are information recording layers. The laser light source is also omitted in the figure for brevity. It is assumed that a collimated laser beam from a laser light source enters an objective lens 401. The position of the smallest beam spot of the laser beam that emerges from the objective lens 401 and travels towards the multi-layer disc lies on the information recording layer 511 as indicated by a beam 80, and an attempt is being made to read information from the information recording layer 511. The optical disc 501 is spinning, and as shown in FIG. 22, guide grooves, i.e., tracks, for tracking are formed in the information recording layer 511. FIG. 22 shows a portion of the information recording layer, where it is assumed that the rotational axis is located to the far left of the sheet. A laser beam, as a light spot 94, irradiates these guide grooves. If directions perpendicular to the optical axis were to be defined in relation to the rotational axis, the direction of arrow 521 would be the radial direction, and the direction of arrow 522 would be the tangential direction.

Since the irradiation light is focused on the recording layer 511, the reflection light thereof traces the same optical path as the incident light, only in the reverse direction, and returns to the objective lens 401 in FIG. 21. If the intensity distribution of the reflection light were to be measured at position 523, which is reached after having traveled through the objective lens, it would be as shown in FIG. 23. In this case, only the effects of the guide grooves are taken into account, and there is observed what is called a ball pattern due to diffracted light that occurs in a perpendicular direction relative to the grooves. Specifically, bright and dark areas 941 and 942 appear in the radial direction, and the brightness/darkness varies depending on the positional relationship with the guide grooves. Next, the emergent light from the objective lens 401 in FIG. 21 travels through an astigmatic detection lens 402, and irradiates a semiconductor detector 51 as light beam 801. The semiconductor detector 51 is provided at the position of a circle of least confusion.

FIG. 24 shows the incident state, on the semiconductor detector 51, of the reflection light from the disc. The reflection light is detected by a grid-like quadrant semiconductor detector 541 disposed in the center. The reflected beam from the layer of interest irradiates the semiconductor detector 541 as a spot 811. The ball pattern of the spot 811 would be as shown in FIG. 25. Unlike in FIG. 23, the ball pattern appears at the top and the bottom, and the tangential direction and the radial direction are switched. This is because the direction of astigmatism is tilted by 45 degrees relative to the tangential direction. In such an irradiation state of reflection light, assuming that the names of the detection regions of the quadrant semiconductor detector 541 are respectively A, B, C and D, and that their respective signal names are also A, B, C and D, then tracking error signal TE may be expressed as TE=(A+B)−(C+D). Further, assuming that AF is the focus error signal and RF the data signal, then AF=A+C−(B+D) and RF=A+C+B+D.

While the operations of an optical pickup that uses an astigmatic method with a quadrant semiconductor detector may be explained in principle, in practice, the objective lens has to be moved in the radial direction for tracking. In order to eliminate any imbalance in the tracking error signal caused thereby, the light beam is detected by being divided in four or more parts as described in Non-Patent Document 3.

Multi-layer discs are designed in such a manner that when the disc is irradiated with laser light, the amounts of reflection light from the respective layers would be approximately the same amount. Therefore, the layers closer to the objective lens have greater transmittance so as to enable irradiation of the layers farther from the objective lens with the laser beam. Under such conditions, when a laser beam is focused on the layer 511, which is an information read-out target layer as shown in FIG. 21, part of the laser beam passes through the layer of interest 511 as light beam 82, is reflected by the adjacent layer 512, and becomes stray light as represented by, for example, reflection light 83. This reflection light 83 returns to the objective lens 401, and, after entering the detection lens 402, is first focused at a position slightly short of the photodetector 51, and reaches the semiconductor detector 51 while expanding as indicated by beam 804. On the surface of the semiconductor detector, the beam 804 becomes an expanded optical spot 841 as shown in FIG. 24, and is placed in a state where it covers the four detection regions 541. It thus interferes with the optical spot 811 that is simultaneously present on the detector. This interference is affected by changes in the phase of the optical spot 841 that result from the non-uniformity of the inter-layer spacing, and thus varies. Fluctuations in RF signal intensity, which is the total light amount, caused by this interference worsen the jitter of the RF signal, and exacerbates the error rate during data read-out. Further, the TE signal is also affected at the same time by this interference, and fluctuations become particularly pronounced when there are positional displacements of the semiconductor detector, a tilt of the optical disc, etc., as a result of which it becomes difficult to follow the guide grooves on the spinning disc with the spot. Reflection light also occurs from the adjacent layer when the adjacent layer 512 is located closer to the objective lens than the read-out target layer 511, causing problematic interference in a similar fashion.

One aspect of the present invention, with respect to optical pickup devices, relates to reducing the effects of the above-mentioned interference from other layers on TE and AF signals. In addition, another aspect relates to simultaneously reducing the overall size of the semiconductor detector as much as possible.

In order to solve the problems above, in the present invention, a diffraction grating that is divided into a plurality of regions is used in the return path for the reflection light from a multi-layer disc. The position on a semiconductor detector irradiated with the diffracted light from a center region of the diffraction grating is set apart from the optical axis, and stray light is prevented from being incident on a sensing region to be used for some other control signal. In addition, by dividing the center region of the diffraction grating into a first region and a second region, the overall size of the semiconductor detector is reduced.

An optical pickup device of an embodiment of the present invention comprises: a laser light source; an irradiation light focusing optical system that focuses a laser beam from the laser light source on one recording layer of a multi-layer optical information storage medium; and a detection optical system that detects reflection light reflected from a recording layer of the multi-layer optical information storage medium. The detection optical system comprises: a detection lens; a diffraction grating that is divided into a plurality of regions; and a semiconductor detector comprising a plurality of sensing regions. The diffraction grating is located between the detection lens and the semiconductor detector. Sensing regions other than a sensing region that detects light that has been diffracted at a center region of the diffraction grating are arranged at positions where stray light does not reach, and these sensing regions detect light that has been diffracted at regions other than the center region of the diffraction grating.

The diffraction directions of a first region and a second region into which the center region of the diffraction grating is divided are defined in such a manner that diffracted light of, among the stray light from recording layers other than a selected recording layer, stray light that travels through the first region and the second region and whose shape becomes largest on the semiconductor detector takes on, on the semiconductor detector, a shape whose protruding part faces the opposite side to the optical axis.

If all focal points of stray light are located on the semiconductor detector-side of the diffraction grating, the directions of the respective diffracted light from the first region and the second region are made to be such directions that they pass through the optical axis and intersect with each other. In addition, if stray light having a focal position on the detection lens-side of the diffraction grating becomes largest in shape on the semiconductor detector after traveling through the first region and the second region, the directions of the respective diffracted light from the first region and the second region are made to be such directions that they do not pass through the optical axis and move away from each other's region. If stray light having a focal position on the semiconductor detector-side of the multi-region diffraction grating becomes largest in shape on the semiconductor detector after traveling through the first region and the second region, the directions of the respective diffracted light from the first region and the second region are made to be such directions that they pass through the optical axis and intersect with each other. The optical systems are preferably set in such a manner that the focal position of stray light and the position of the multi-region diffraction grating do not coincide.

An information reading method according to an embodiment of the present invention comprises: a step of focusing read-out light on one selected recording layer of a multi-layer optical information storage medium; a step of generating a plurality of diffracted light beams by passing reflection light reflected from the selected recording layer through a multi-region diffraction grating that is divided into a plurality of regions and of detecting the plurality of diffracted light beams with a semiconductor detector comprising a plurality of sensing regions; a step of generating a focus error signal and a tracking error signal by computing detection signals of diffracted light beams that have passed through regions other than a center region of the multi-region diffraction grating; a step of performing focus control using the focus error signal and of performing tracking control using the tracking error signal; and a step of generating an RF signal by computing detection signals including a diffracted light beam that has passed through the center region of the multi-region diffraction grating, wherein a diffraction angle from, among the plurality of regions of the multi-region diffraction grating, the center region including an optical axis is greater than the diffraction angles from other divided regions, the center region is divided into a first region and a second region by a straight line passing through the optical axis, the number of diffracted light beams from the first region and the second region is one each, and diffraction directions of the first region and the second region are defined in such a manner that a diffracted light beam of, among stray light from recording layers other than the selected recording layer, stray light that passes through the first region and the second region and whose shape becomes largest on the semiconductor detector would be of a shape that protrudes towards the opposite side to the optical axis on the semiconductor detector.

Dividing the center region of the multi-region diffraction grating into two parts as in an embodiment of the present invention is particularly effective when, depending on the selected recording layer, the focal spot, on the multi-region diffraction grating, of stray light that passes through the center region and whose shape becomes largest on the semiconductor detector is placed in a state where it is included in the center region.

According to an embodiment of the present invention, since reflection light from other layers is prevented from being incident on a sensing region that is used for positional control of the objective lens, the effects of the reflection light from other layers on the tracking error signal and the focus error signal are eliminated, allowing for stable tracking and focusing. Thus, the reliability of the data that has been read improves. Further, by dividing the center region of the multi-region diffraction grating, it is possible to reduce the overall size of the semiconductor detector, and to lower the cost of the semiconductor detector.

DETAILED DESCRIPTION OF PREFERRED EMBODIMENTS

Next, the present invention is described by way of embodiments.

Embodiment 1

Figure 1:
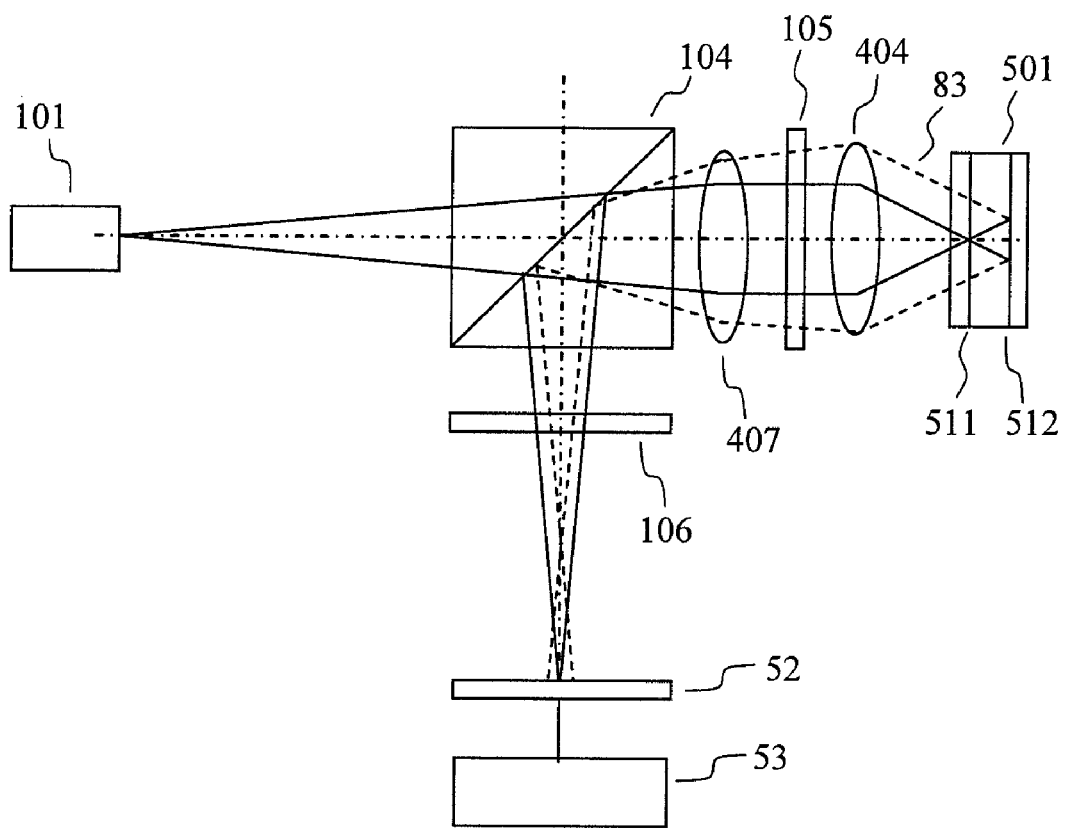
FIG. 1 is a view showing one example of an optical system of an optical pickup device according to an embodiment of the present invention.

FIG. 1 is a view showing one example of an optical system of an optical pickup device according to an embodiment of the present invention. A laser beam emitted from a semiconductor laser 101 travels through a polarizing beam splitter 104, and thereafter becomes a collimated beam at a collimating lens 407. It is next converted into circularly polarized light by a quarter-wave plate 105, and focused by an objective lens 404 onto a multi-layer disc 501 that spins by means of a spinning mechanism. While the diagram here shows a dual-layer disc, it is by no means limited as such and is applicable to multi-layer discs with three or more layers as well. An information recording layer (layer of interest) 511 is the read-out target, and reflection light is generated at the position of the smallest spot of the laser beam on the layer 511. The portion of the laser beam travels through the target layer 511 is reflected at an adjacent layer 512 to become reflection light 83, and becomes stray light which causes crosstalk. In the case of multi-layers, spherical aberration varies depending on the distance from the disc surface to the layer, but compensation therefor is performed by shifting the collimating lens 407 in the direction of the optical axis.

The reflection light from the multi-layer disc, including stray light, returns through the objective lens 404, and is converted by the quarter-wave plate 105 into linearly polarized light whose polarization direction is orthogonal relative to the original polarization direction. Thus, it is reflected at the polarizing beam splitter 104 and is diffracted and focused onto the semiconductor detector 52 with a multi-region diffraction grating 106. Signals from the semiconductor detector are processed at a signal processing circuit 53, and an AF signal for controlling the focal position of the optical spot, a TE signal for controlling the tracking position, and an RF signal, which is a data signal, are formed.

Figure 2:
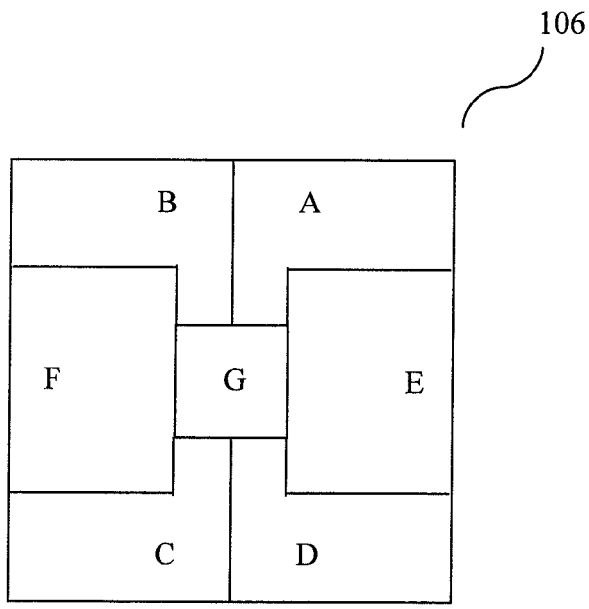
FIG. 2 is a view showing one example of a divided state of a multi-region diffraction grating according to an embodiment of the present invention.
Figure 3:
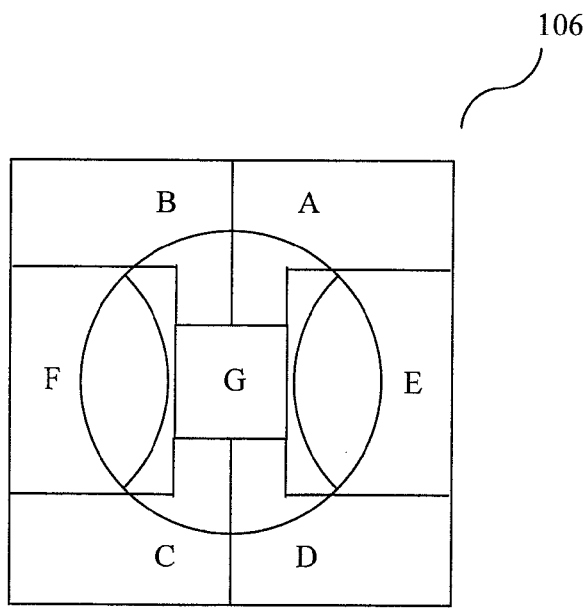
FIG. 3 is a view showing reflection light from the layer of interest and that irradiates a multi-region diffraction grating.

The divided state of the multi-region diffraction grating 106 used in the optical system shown in FIG. 1 is shown in FIG. 2. The multi-region diffraction grating 106 is divided into a plurality of regions, and the respective regions are identified with the letters A to G. This division method is an arrangement that makes it easier to avoid stray light from other layers and to adjust the detector since the division is not numerous and the number of beams can be reduced. FIG. 3 shows an irradiation state of the reflection light from the layer of interest on the multi-region diffraction grating 106. A ball pattern caused by the tracks of the disc is shown in the irradiation state. The regions where the intensity of the ball pattern varies are E and F, and the track direction is in the up/down direction with respect to the sheet. The diffracted light beams from the respective regions of the multi-region diffraction grating 106 irradiate sensing regions 551-561 of the semiconductor detector shown in FIG. 4 with optical spots. It is assumed that the direction and shape of the grooves in the respective diffraction gratings are appropriately designed so as to attain the desired spot positions and irradiation light intensity.

Figure 5:
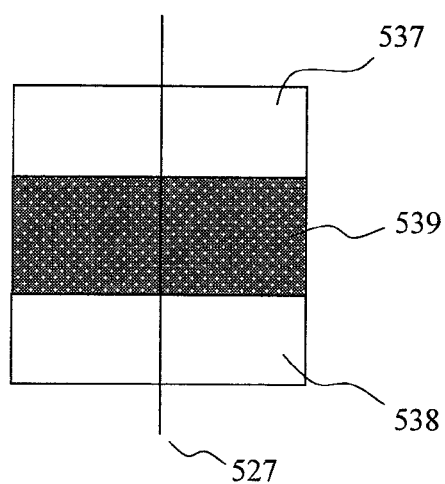
FIG. 5 is a view showing a sensing region.
Figure 6:
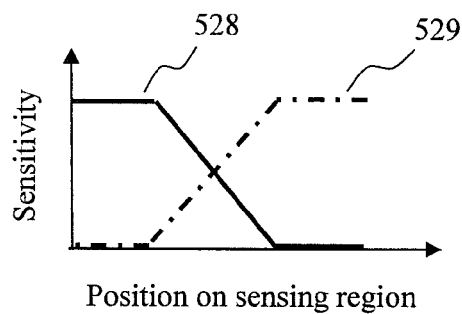
FIG. 6 is a diagram showing changes in sensitivity at a dark line.

FIG. 5 shows an enlarged view of the sensing regions 551-554. It is assumed that these four regions have the same shape. There is a dark line region 539 between sensing regions 537 and 538, and the dark line region is included in the sensing regions 537 and 538 in an overlapping manner. FIG. 6 shows the detection sensitivity of the sensing regions 537 and 538 with respect to a case where a small beam spot is moved along straight line 527 in FIG. 5. Solid line 528 represents the detection sensitivity of the sensing region 537, which decreases as the spot moves from the dark line region 539 towards the sensing region 538, and the sensitivity drops to zero once the spot is at the sensing region 538. Further, the sensitivity of the sensing region 538 is represented by dashed-dotted line 529. In this case, sensitivity is conversely highest when the spot is on the sensing region 538, decreases as the spot moves towards the sensing region 537, and drops to zero once the spot is at the sensing region 537. By arranging such a sensitivity distribution on the dark line region 539, it is possible to obtain a smooth signal with respect to the focus error signal discussed below.

Figure 4:
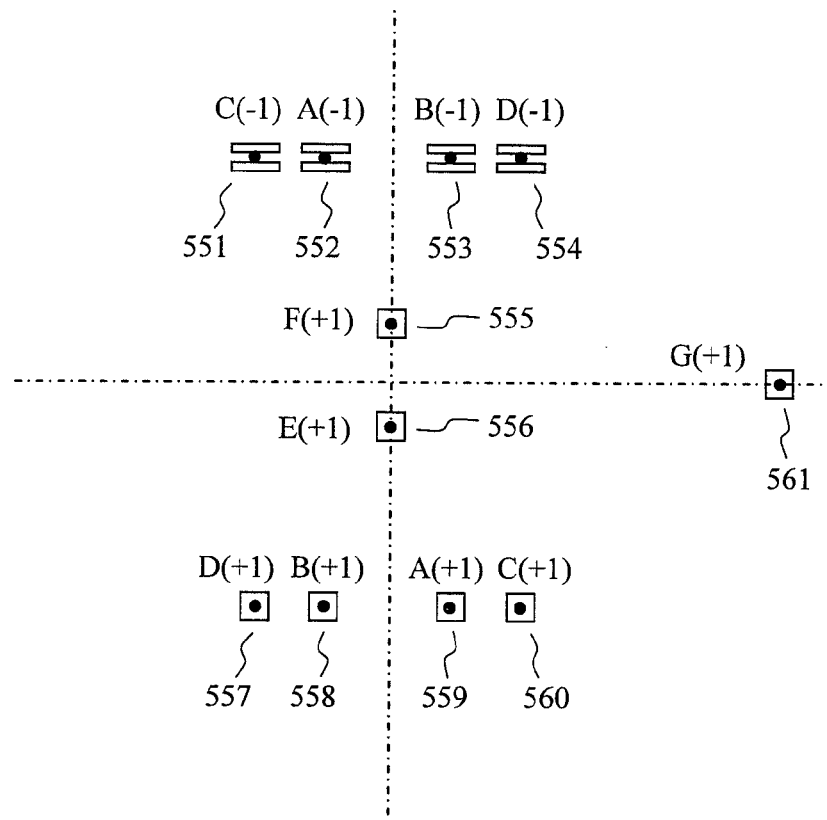
FIG. 4 is a view showing one example of sensing regions on a semiconductor detector according to an embodiment of the present invention.

In FIG. 4, the respective symbols indicated near the sensing regions represent the respective region names of the multi-region diffraction grating and the orders of the diffracted light beams. By way of example, it is indicated that the light irradiating the sensing region 551 is the first negative order light diffracted by region C of the multi-region diffraction grating in FIG. 3. The sensing regions 555 through 561 do not have a dark line region and have sensitivity only at enclosed regions. For each of the diffraction gratings of the multi-region diffraction grating 106 in the present embodiment, a blazed grating or a sawtooth grating is used. Regions E, F and G produce first positive order light only, and regions A, B, D and C produce both first positive order light and first negative order light.

Figure 7:
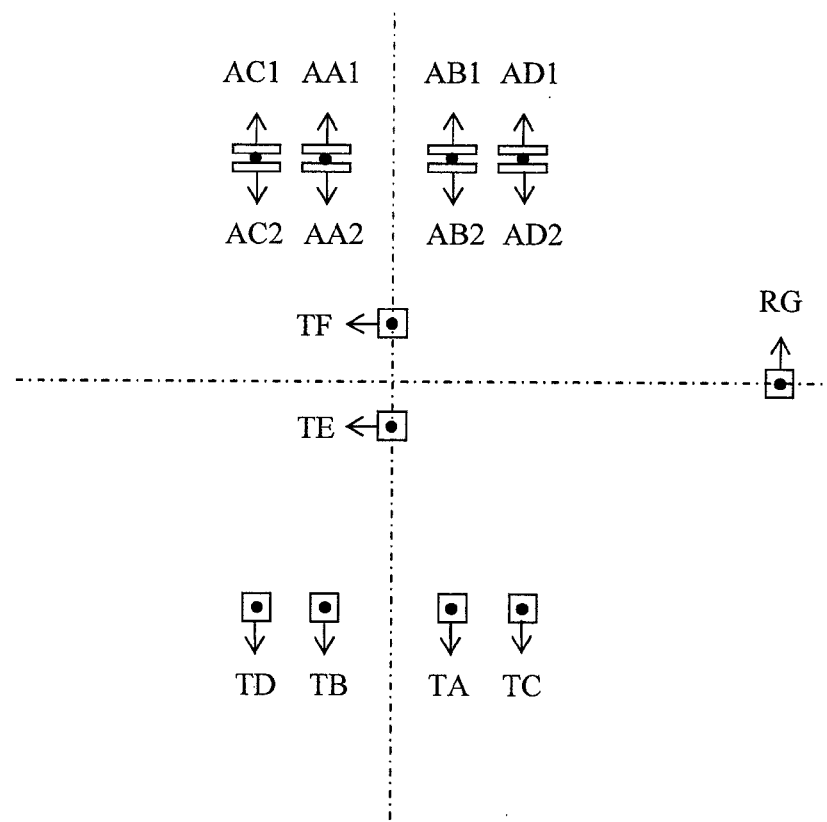
FIG. 7 is a view showing the names of output signals from sensing regions on a semiconductor detector.

Next, a processing method for the signals detected at the sensing regions in FIG. 4 is presented. The names of the respective output signals from the sensing regions in FIG. 4 are shown in FIG. 7. The symbols indicated by the respective arrows assigned to the detectors represent the respective output names from those sensing regions. By combining these signals, a focus error signal and a tracking error signal for controlling the position of the objective lens, an RF signal relating to data, etc., are formed. In the present embodiment, a knife-edge method is employed as a focus control method, and a compensated DPP (Differential Push-Pull) method is employed as a tracking control method. The focus error signal AF is formed in the format AF=(AC1−AC2)+(AD1−AD2)−{(AA1−AA2)+(AB1−AB2)}, and the tracking error signal TE would be TE=(TE−TF)−k{(TA+TD)−(TB+TC)}. The RF signal is expressed as RF=RG+TE+TF+TD+TB+TA+TC. In the above, k represents a constant for preventing a DC component from being generated in the TE signal when the objective lens is moved in the radial direction for tracking.

When reading a groove-less ROM disc, a DPD (Differential Phase Detection) method may be employed for tracking. In this case, assuming that the phase difference detected from signals TA and TB is T1 and that the phase difference detected from signals TC and TD is T2, then the tracking error signal TE would be TE=T1+T2. The RF signal and the AF signal would be the same as in a disc with grooves.

Figure 8:
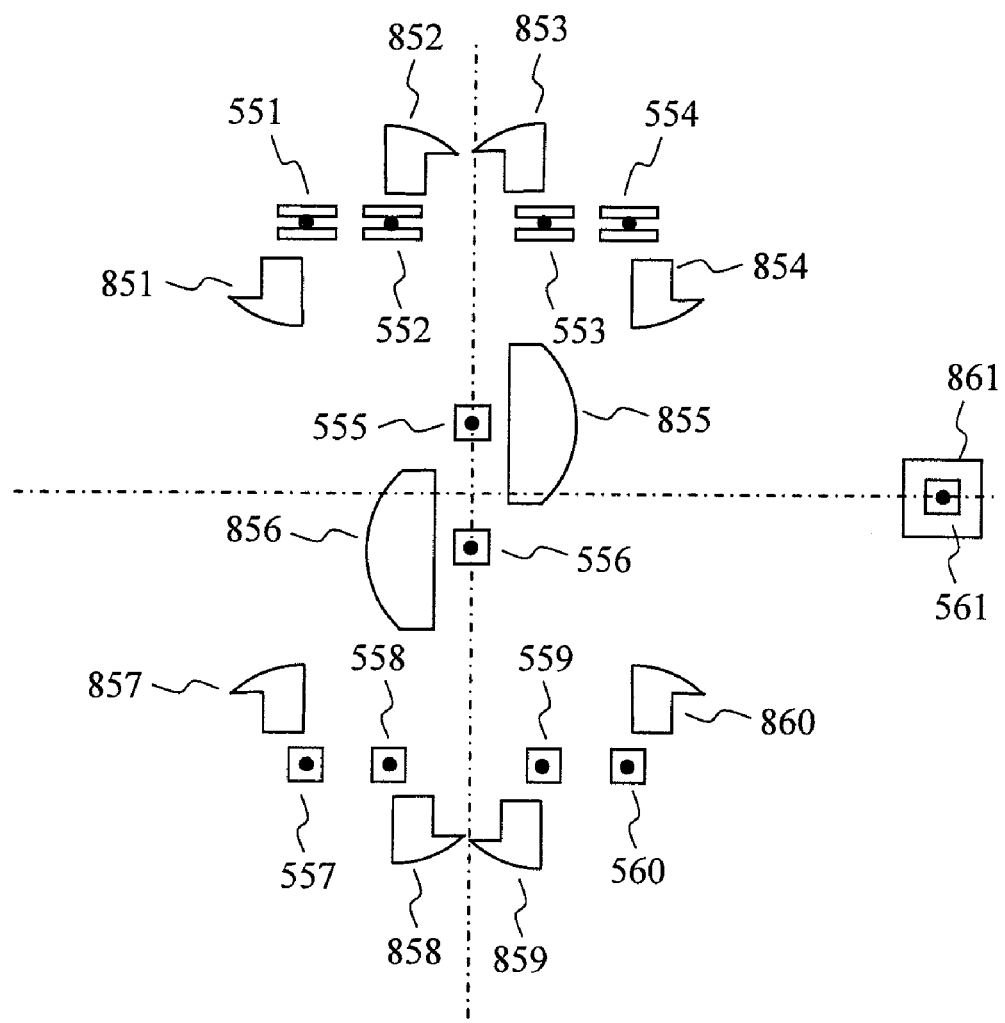
FIG. 8 is a view showing a distribution of stray light from adjacent layers on a semiconductor detector.

With a multi-layer disc, stray light from other layers irradiates the semiconductor detector along with the reflection light from the layer of interest. A distribution of stray light from an adjacent layer closer to the objective lens is shown in FIG. 8. The stray light 851 through 854 and stray light 857 through 860 are those that have traveled through regions A through D of the multi-region diffraction grating 106. Further, stray light 855 and 856 are those that have traveled through regions E and F, respectively. Region G in the center part is of an appropriate size, and since the stray light 851 through 856 do not travel through the center region G, they do not irradiate the sensing regions 551-560. Thus, stray light does not affect the focus error signal formed from the sensing regions 551-554 or the tracking error signal formed from the sensing regions 555-560.

Since stray light 861 is of the center part, it irradiates the sensing region 561. This sensing region is associated with the RF signal, and the stray light thus affects the RF signal. However, it is possible to eliminate the effects of stray light by using a high pass filter.

Figure 9:
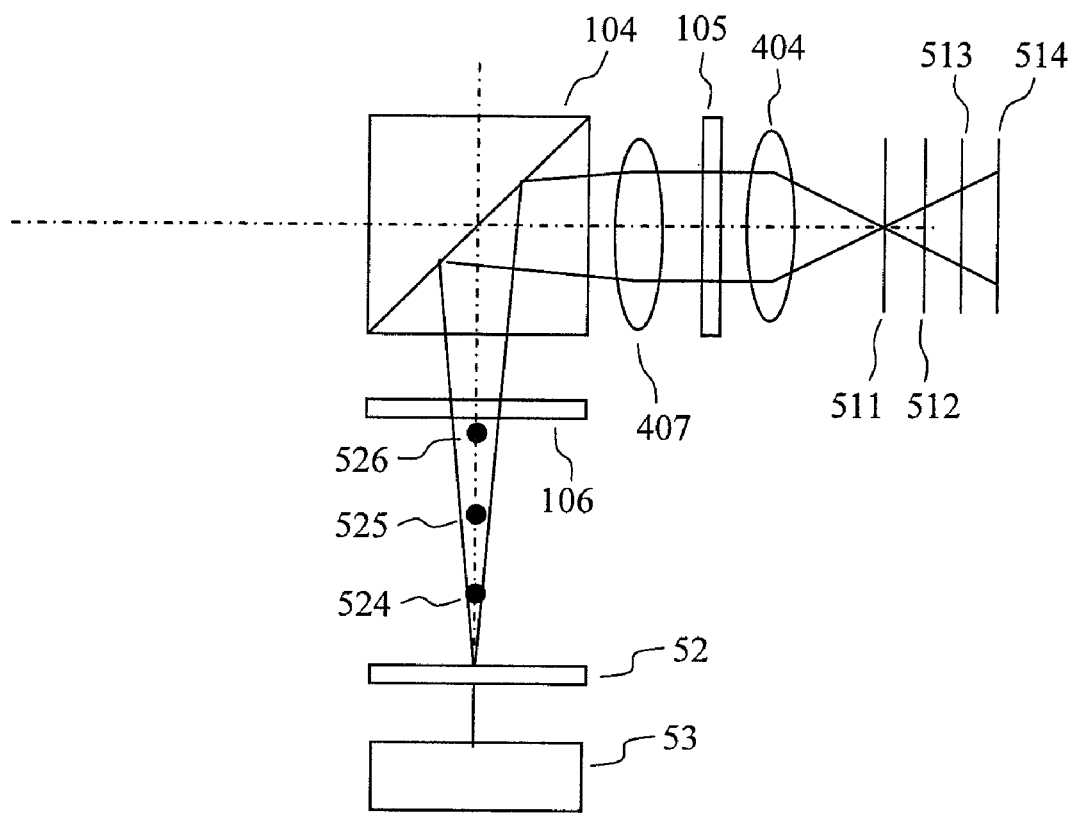
FIG. 9 is a view showing one example of focal positions of stray light from other layers.
Figure 10:
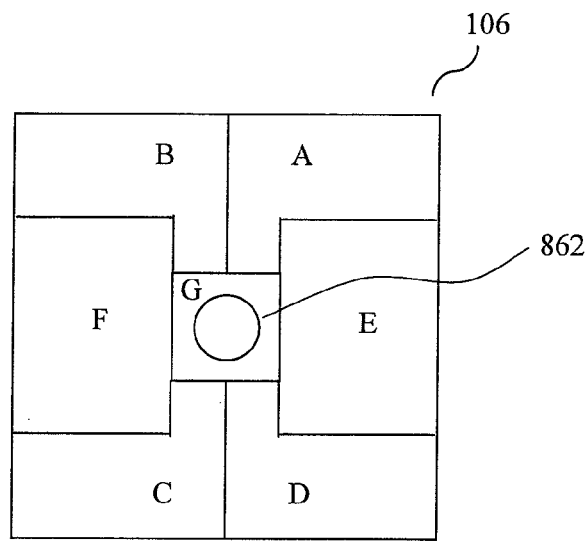
FIG. 10 is a view showing a distribution of stray light on a multi-region diffraction grating.
Figure 11:
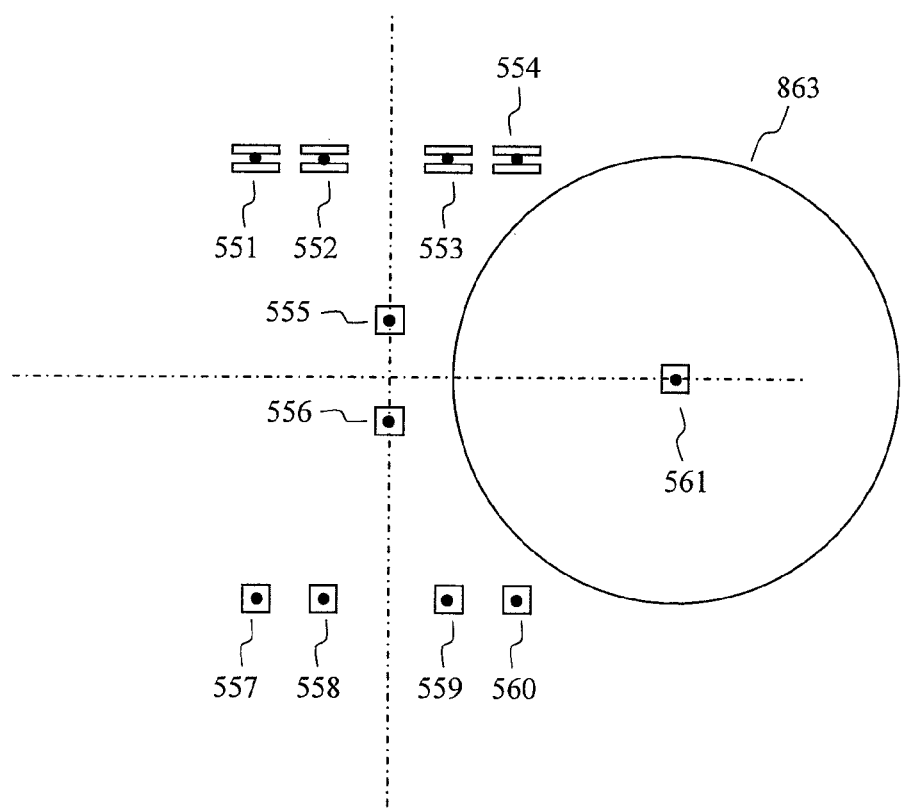
FIG. 11 is a view showing a distribution of stray light on a semiconductor detector.

With a multi-layer disc, there exist a plurality of gaps between the layer of interest and layers that cause stray light. The state of stray light varies with how far/near the layers that cause stray light are to the objective lens relative to the layer of interest and with the inter-layer spacing relative to the layer of interest. FIG. 9 shows focal positions of stray light from a multi-layer disc at the detection optical system. The multi-layer disc has four layers, and it is assumed that layer 511 is the layer of interest. The focal position of the stray light from recording layer 512 is at focal point 524, and the focal positions for recording layers 513 and 514 are at focal points 525 and 526, respectively. Since the stray light from recording layers 512 and 513 results in light intensity distributions similar to that in FIG. 8, no crosstalk occurs. However, stray light from a layer that is far apart from the layer of interest, as in recording layer 514, sometimes produces a focal point near where the multi-region diffraction grating 106 is installed, which results in region G of the multi-region diffraction grating 106 being strongly irradiated with spot 862 as shown in FIG. 10. By way of example, it is assumed that the inter-layer spacing between recording layers 511 and 514 of the optical disc is approximately 47 μm, and that the refractive index of the substrate is 1.6. Further, it is assumed that the focal length of the objective lens is 1.176 mm, and that the magnification of the detection system is 12×. Under these conditions, the focal position of the stray light from recording layer 514 falls 5.1 mm short of the semiconductor detector 52. In other words, if the multi-region diffraction grating 106 were disposed near this focal position, since most of the stray light would travel through region G, there would be a large circular spot 863 centered around the sensing region 561 on the semiconductor detector as shown in FIG. 11. Such states of stray light are also taken into consideration in arranging the sensing regions, and the sensing region 561 is located further away from the optical axis than the other sensing regions so that the stray light spot 863 would not fall on the sensing regions 551-560.

Figure 12:
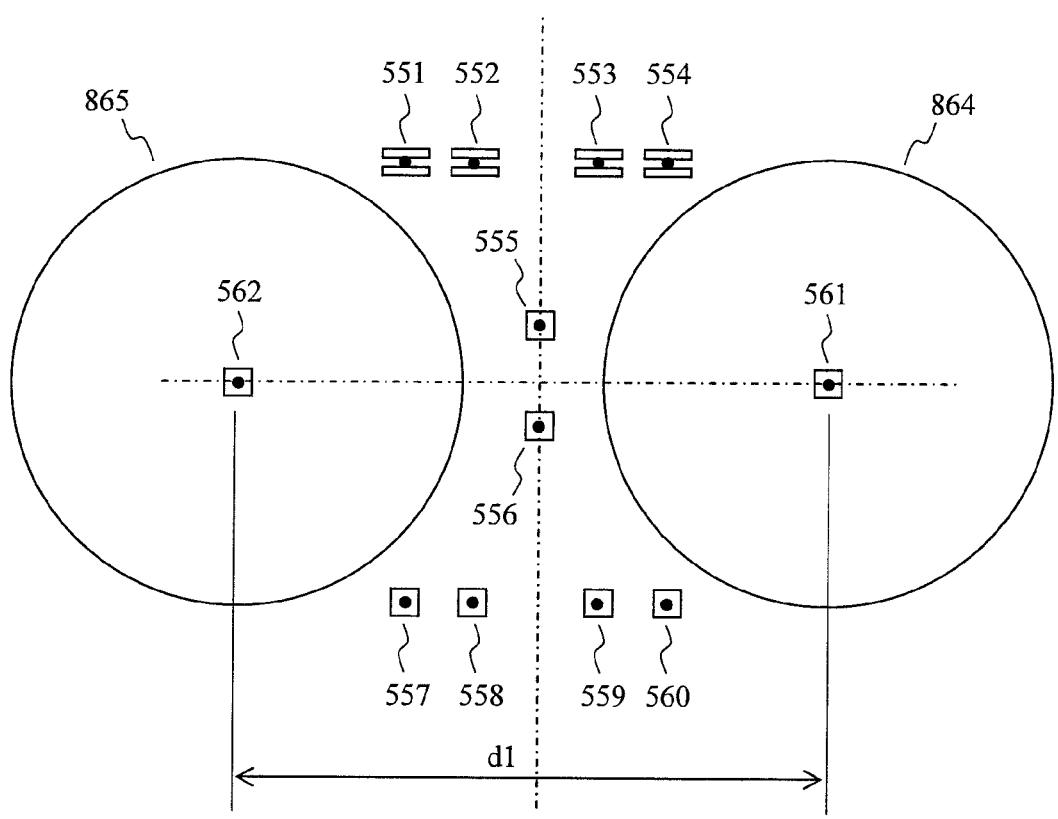
FIG. 12 is a view showing a distribution of stray light on a semiconductor detector.

Region G in FIG. 10 is a blazed diffraction grating that only generates first positive order light, and the light from the layer of interest that has traveled through region G is incident on the sensing region 561 in FIG. 11. If there is a need to set the sensing region 561 far apart from the optical axis, the pitch of the blazed grating would have to be made finer. If it is difficult to produce such a fine grating, it may instead be a rectangular grating. Since rectangular gratings do not require oblique grating shapes, it becomes easier to produce finer pitches. FIG. 12 shows an arrangement of sensing regions of a semiconductor detector and a state of stray light in a case where a rectangular grating is used for region G. With rectangular gratings, the first positive order light and the first negative order light are diffracted with the same intensity. Therefore, a new sensing region 562 for that purpose is added, and is used in addition to the output of the sensing region 561 as an RF signal. As stray light, a new large spot 865 is generated, and the intensities of the stray light 864 and 865 become roughly comparable.

Embodiment 2

Figure 13:
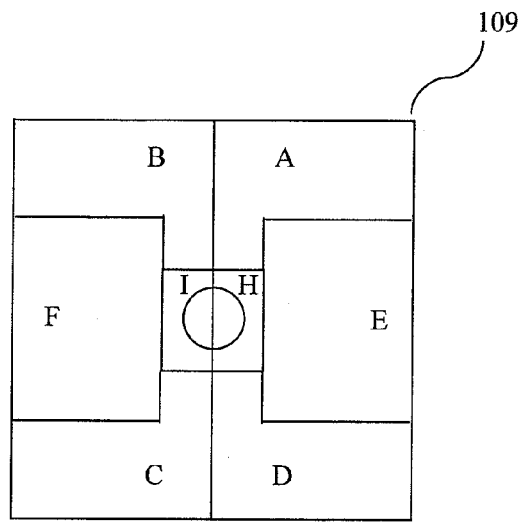
FIG. 13 is a view showing one example of a divided state of a multi-region diffraction grating according to an embodiment of the present invention.
Figure 14:
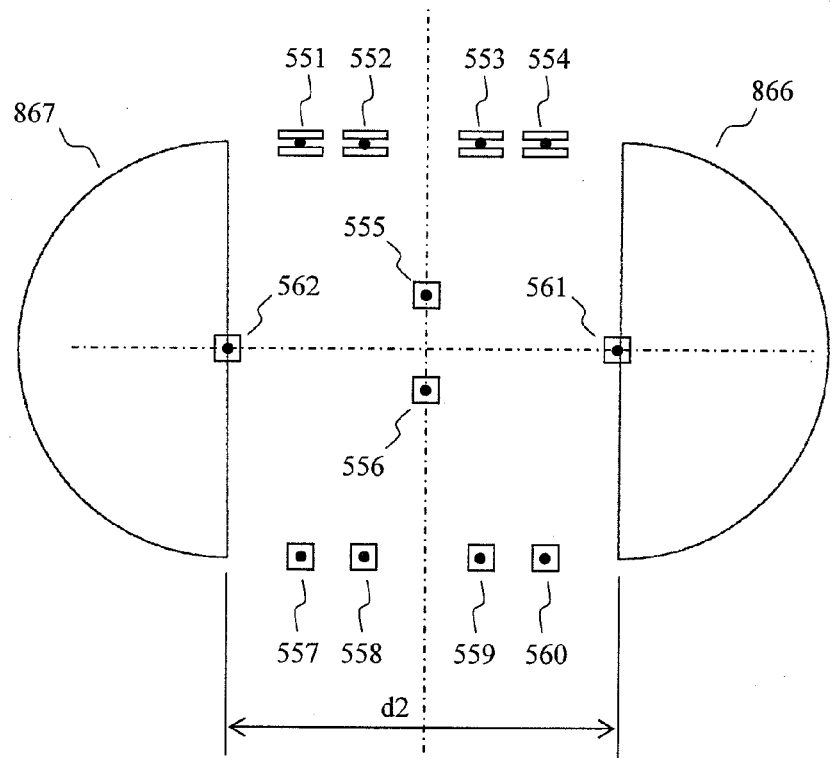
FIG. 14 is a view showing a distribution of stray light on a semiconductor detector.

In the present embodiment, a multi-region diffraction grating 109 shown in FIG. 13 is used. For the actual optical system of the optical pickup device, one that is similar to that of Embodiment 1 shown by way of example in FIG. 1 is used. The difference with respect to the multi-region diffraction grating 106 shown in FIG. 10 is that the center region is divided into two regions, namely, regions H and I. If, regardless of which layer of a multi-layer disc is read, focal points of stray light from other layers are on the semiconductor detector 52-side of the multi-region diffraction grating 106 as shown in FIG. 9, the stray light having the focal point closest to the multi-region diffraction grating and which forms the largest image on the semiconductor detector may be made to be semi-circular as shown in FIG. 14. Diffraction gratings that only generate first positive order light are created at regions H and I, and the stray light of region H corresponds to a stray light spot 867 on the semiconductor detector, and the stray light that travels through region I corresponds to a stray light spot 866. The stray light spots 866 and 867 correspond to two shapes that are produced by dividing a circle with a straight line, and are each so arranged that the straight line part is turned towards the optical axis and the protruding part is turned away from the optical axis. Since the focal position is located behind the multi-region diffraction grating 109, the semicircle state on the semiconductor detector is the inverse of the semicircle state on regions H and I. Although the focal positions of the stray light from other layers may be located further behind the semiconductor detector 52 in some cases, it does not become a problem since the stray light does not become larger.

By thus dividing the center of the multi-region diffraction grating, the circular stray light of the largest shape shown in FIG. 12 can be made semicircular as shown in FIG. 14. Consequently, the stray light-irradiated region may be made smaller, and it becomes possible to bring the sensing regions 561 and 562 closer to the optical axis. As a result, it becomes possible to make gap d2 in FIG. 14 smaller than gap d1 between the sensing regions 561 and 562 in FIG. 12. In other words, since the area of the semiconductor detector can be made smaller, it becomes possible to lower the cost of the semiconductor detector.

Figure 15:
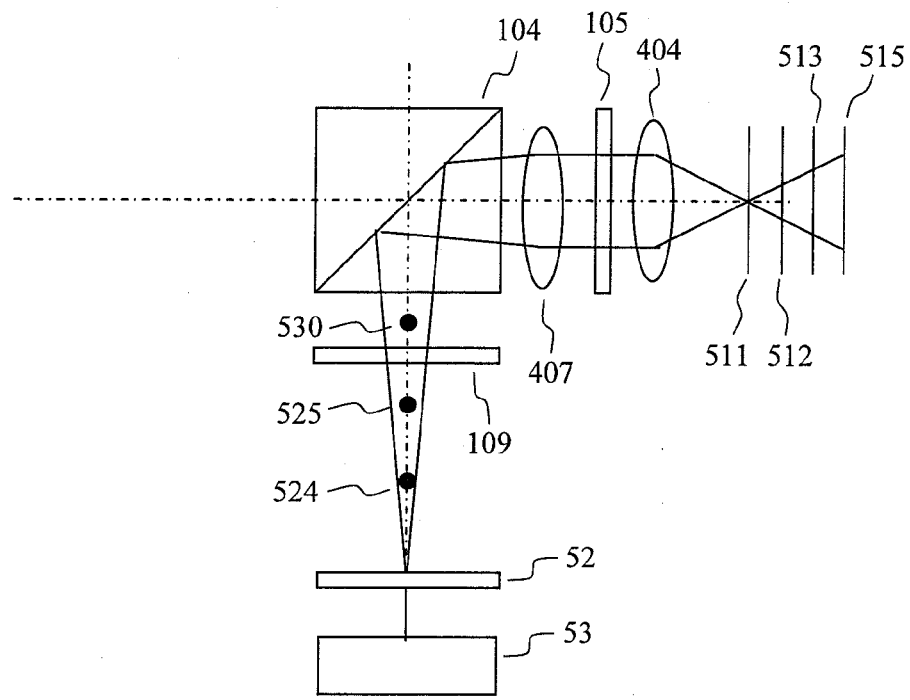
FIG. 15 is a view showing one example of focal positions of stray light from other layers.

FIG. 15 shows a state where focal positions of stray light are located in front of and behind the multi-region diffraction grating 109. When the inter-layer spacing between recording layer 515, which causes stray light, and layer of interest 511 is wide, the focal position of the stray light from recording layer 515 may in some cases fall short of the multi-region diffraction grating 109. In cases where the stray light resulting in the largest irradiated area is generated from that of focal position 530, this stray light is made to be semicircular so as to prevent the stray light from expanding in the direction of the optical axis center on the semiconductor detector. In this case, since the semicircular state on the multi-region diffraction grating 109 in FIG. 13 and the semicircular state on the semiconductor are not the inverse of each other, the direction of the grating is so defined that the stray light from region H would become the stray light spot 866 in FIG. 14. Similarly, the direction of the grating of region I is so defined that the stray light from region I would correspond to the stray light spot 867 in FIG. 14. By designing the distances of the sensing regions 561 and 562 from the optical axis in FIG. 14 in such a manner that the other stray light with smaller shapes and which expands in the reverse direction would not fall on the inner detectors, it becomes possible to bring them closer than the distances of the sensing regions 561 and 562 from the optical axis in FIG. 8.

With respect to FIG. 15, when the largest stray light is generated from that of focal position 525, this stray light is also made to be semicircular so as to prevent the stray light from expanding in the direction of the optical axis center on the semiconductor detector. In this case, unlike what is discussed above, the semicircular state on the multi-region diffraction grating 109 in FIG. 13 and the semicircular state on the semiconductor detector are the inverse of each other. Thus, the directions of the respective gratings are so defined that the stray light from region H would become the stray light spot 867 in FIG. 14 and that the stray light from region I would become the stray light spot 866 in FIG. 14. In this case, too, as in the cases above, it is possible to reduce the gap between the sensing regions 561 and 562, and it becomes possible to lower costs since it allows for a reduction in the area of the semiconductor detector.

Although the multi-region diffraction grating 109 is sandwiched between two focal positions of stray light in FIG. 15, it is undesirable for the multi-region diffraction grating to coincide with a focal position of stray light. A slight displacement of the spot position of stray light in the direction of the optical axis causes the manner in which stray light expands on the semiconductor detector to become inverted, and there is a possibility that stray light may fall on the sensing regions 551 through 560. For this reason, the position of the multi-region diffraction grating along the optical axis is preferably set apart from the focal positions of stray light in advance so that the distribution of stray light on the semiconductor detector would not be inverted even when there occurs displacement of the focal positions of stray light in the direction of the optical axis.

Embodiment 3

In optical pickup, an objective lens within an optical pickup device is displaced in the radial direction for tracking. In so doing, stray light from other layers is also displaced in the radial direction on the multi-region diffraction grating in FIG. 13 and on the semiconductor detector. This does not become a problem if the stray light from other layers that passes through the center part of the multi-region diffraction grating expands in the same direction on the semiconductor detector. However, in cases where the direction of expansion does become inverted depending on the state of stray light, there is a possibility that stray light may fall on sensing regions near the optical axis.

Figure 16:
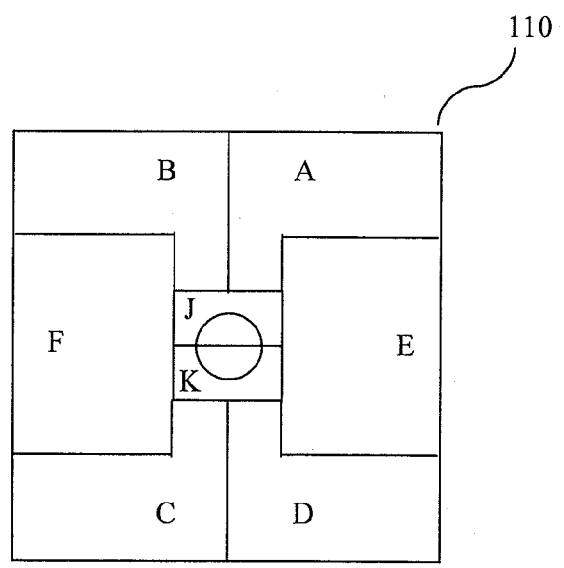
FIG. 16 is a view showing one example of a divided state of a multi-region diffraction grating according to an embodiment of the present invention.
Figure 17:
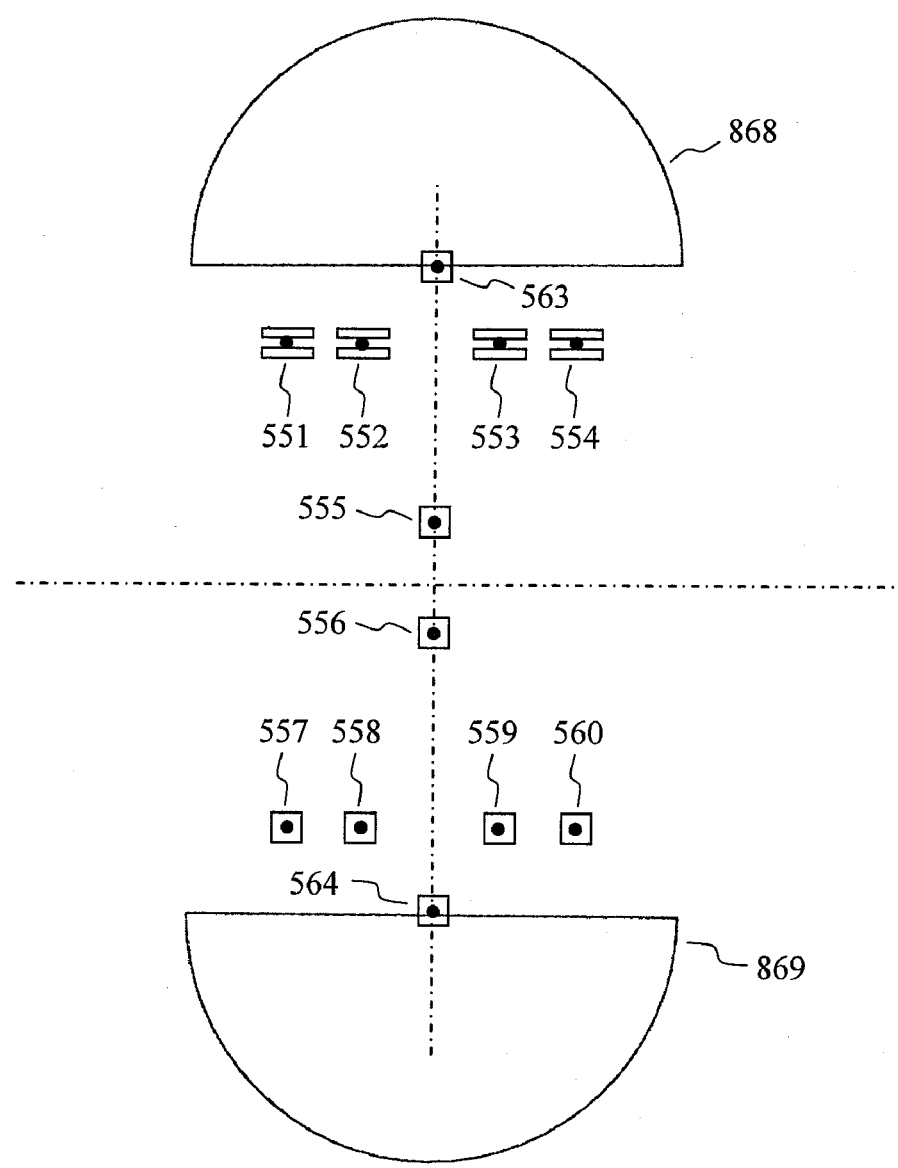
FIG. 17 is a view showing sensing regions of a semiconductor detector and a distribution of stray light.

In such cases, a multi-region diffraction grating 110 shown in FIG. 16 and the semiconductor detector shown in FIG. 17 are used. The center region of the multi-region diffraction grating 110 is divided into regions J and K by a division line extending in the radial direction. Further, the regions that detect the reflection light from the layer of interest that travels through the center region are regions 563 and 564 in FIG. 17. In the present embodiment, it is assumed that the light that travels through region J is diffracted and becomes stray light spot 868 in FIG. 17, and that the stray light that travels through region K corresponds to stray light spot 869. The movement of the stray light spot caused by lens shifts is in the left/right direction in FIG. 16, and is likewise in the left/right direction for stray light spots 868 and 869 on the semiconductor detector in FIG. 17. Since stray light does not move in the up/down direction in FIG. 17, lens shifts do not cause stray light from other layers to fall on the sensing regions near the optical axis.

Embodiment 4

Figure 18:
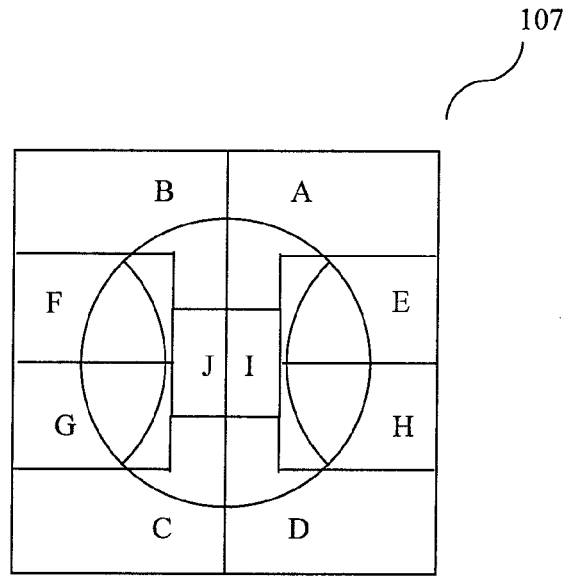
FIG. 18 is a view showing one example of a divided state of a multi-region diffraction grating according to an embodiment of the present invention.
Figure 19:
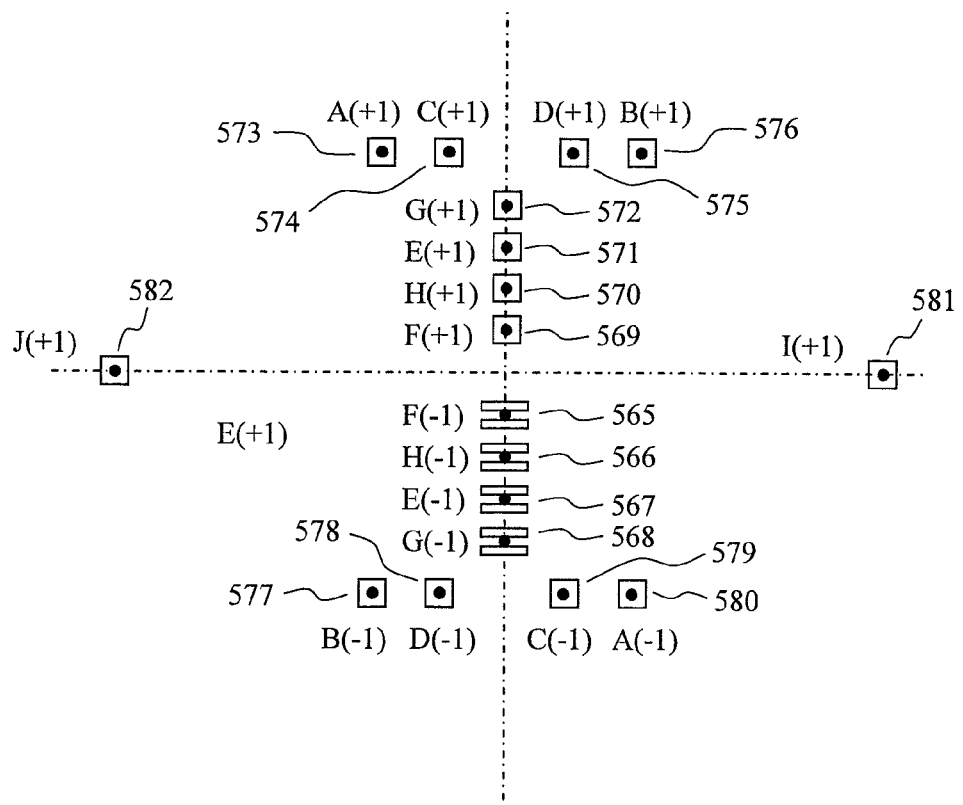
FIG. 19 is a view showing one example of sensing regions on a semiconductor detector according to an embodiment of the present invention.

It is also possible to use a multi-region diffraction grating and semiconductor detector that are based on a dividing method different from that in Embodiment 1, and an example thereof is shown in FIG. 18 and FIG. 19. One of the differences from Embodiment 1 relates to the regions used for focusing. FIG. 18 is a diagram of a multi-region diffraction grating 107 used in the present embodiment, where ball pattern parts are divided in two. The light that travels through regions E, F, G and H contributes to signals for focusing. An arrangement of sensing regions on a corresponding semiconductor detector is shown in FIG. 19. The first negative order light of regions E, F, G and H irradiates sensing regions 565-568 each having a dark line region, and a focus error signal is generated from their signals. Further, a tracking error signal is generated from the first positive order light that emerges from regions A-H of the multi-region diffraction grating. This first positive order light is detected at sensing regions 569-576 to become DPP signals. The center region of the multi-region diffraction grating is divided into regions I and J, which only generate diffracted light beams of the first positive order light. These diffracted light beams are respectively detected at sensing regions 581 and 582 set apart to the left and right, but the arrangement is such that the semiconductor detector area would be small. The RF signal is the sum of the outputs of the sensing regions 569-582. These sensing regions are so arranged as to avoid stray light from other layers, and fluctuations in the tracking error signal or offsets in the focus error signal, etc., due to stray light thus do not occur.

Embodiment 5

Figure 20:
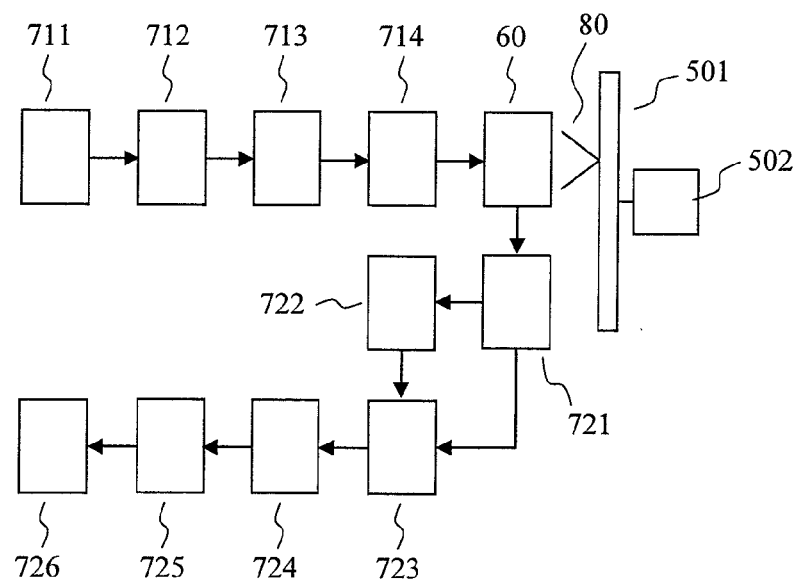
FIG. 20 is a view showing one example of an optical disc drive device using an optical pickup device according to an embodiment of the present invention.
Figure 21:
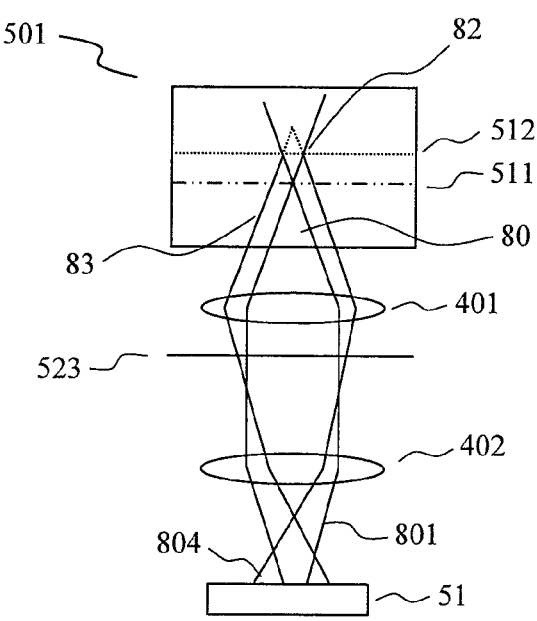
FIG. 21 is a view showing effects of reflection light from another layer.
Figure 22:
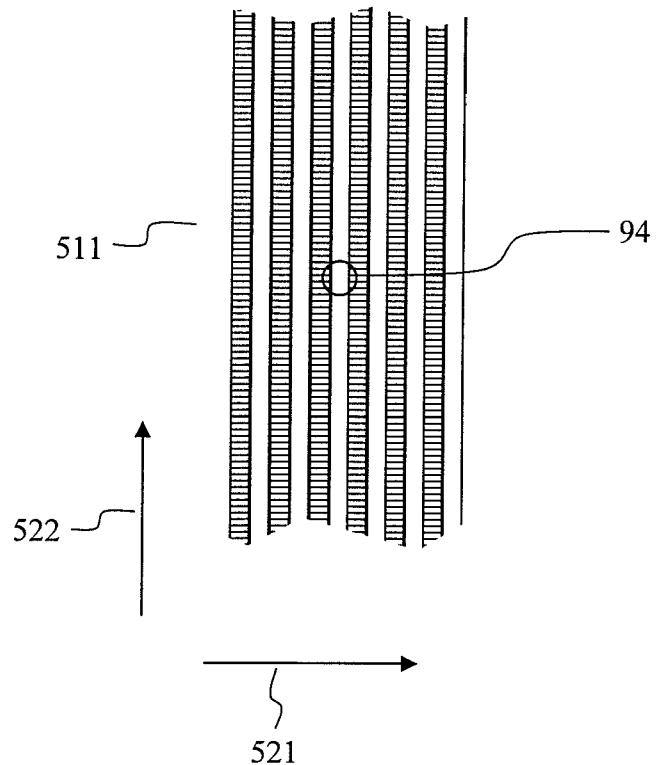
FIG. 22 is a view showing a state in which a beam is irradiating a recording surface with grooves.
Figure 23:
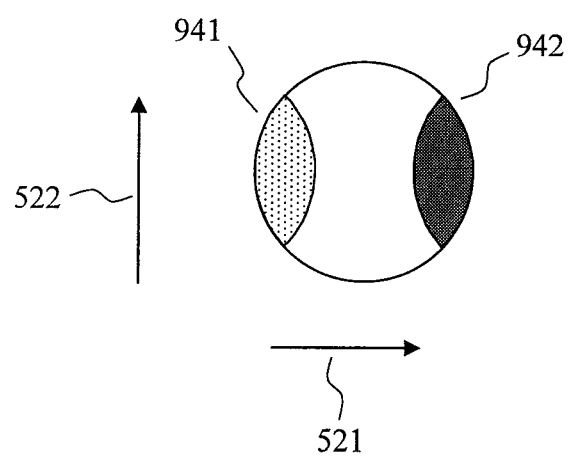
FIG. 23 is a view showing a ball pattern of reflection light from an optical disc.
Figure 24:
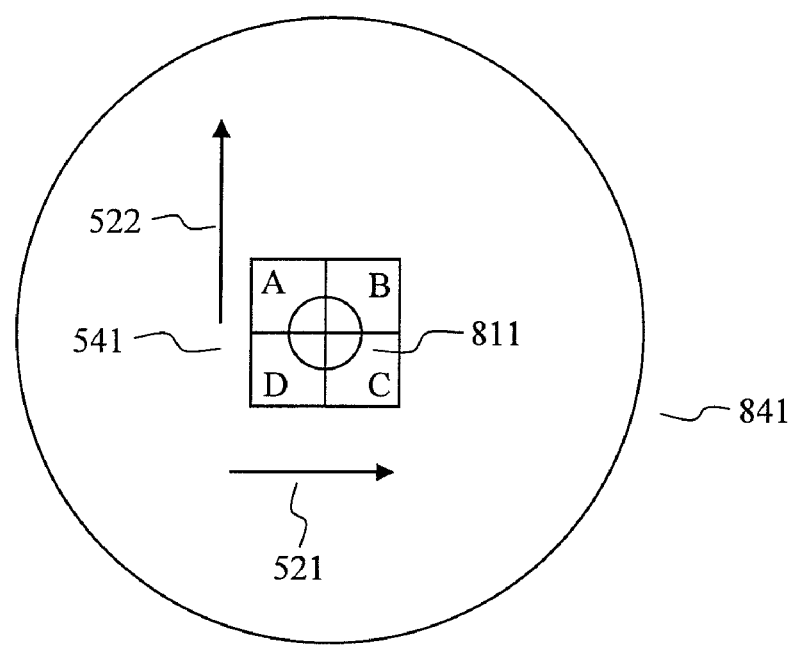
FIG. 24 is a view showing the shape of a photodetector, the positions of optical spots of reflection light from an optical disc, and the expansion of reflection light from another layer.
Figure 25:
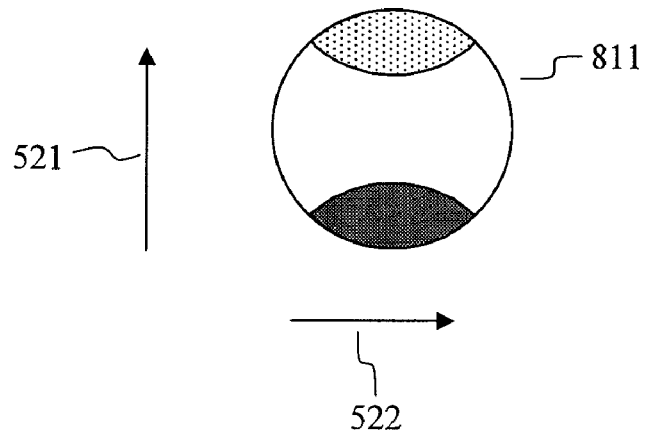
FIG. 25 is a view showing a ball pattern on a photodetector.

FIG. 20 shows an embodiment of an optical disc drive device that uses an optical pickup capable of eliminating the effects of stray light from other layers. Circuits 711-714 are for recording data on a multi-layer optical disc 501. At the error-correcting coding circuit 711, an error-correcting code is added to the data. The recording coding circuit 712 modulates the data using a 1-7 PP scheme. The recording compensation circuit 713 generates a pulse for writing that suits the mark length. Based on the generated pulse sequence, the semiconductor laser within an optical pickup 60 is driven by the semiconductor laser drive circuit 714, and a laser beam 80 emerging from the objective lens is modulated. A phase change film is formed on the optical disc 501 spun by a motor 502. The phase change film heated by a laser beam is placed in an amorphous state when cooled rapidly and in a crystalline state when cooled slowly. These two states differ in reflectivity and are capable of forming marks. In the write state, radio-frequency superimposition, which reduces the coherence of the laser beam, is not performed. Thus, the reflection light from the adjacent layer and the reflection light from the layer of interest are in a state prone to interference. As such, unless measures are taken to reduce stray light, problems may occur, such as tracking being off, the data of an adjacent track being erased, etc. In the present embodiment, one of the optical pickups presented in Embodiments 1, 2 and 3 is employed for the optical pickup 60, and no problems occur with respect to tracking and focusing even with multi-layer discs.

Circuits 721-726 are for reading data. The equalizer 721 improves the signal to noise ratio near the shortest mark length. This signal is inputted to the PLL circuit 722, and a clock is extracted. Further, the data signal processed at the equalizer is digitized in time with the extracted clock at the A-D converter 723. Viterbi decoding is performed at the PRML (Partial Response Maximum Likelihood) signal processing circuit 724. Demodulation is performed at the recording decoding circuit 725 based on the modulation rules of the 1-7 PP scheme, and the data is restored at the error-correcting circuit 726.

INDUSTRIAL APPLICABILITY

According to an aspect of the present invention, stray light from other layers may be eliminated, and tracking and focusing accuracy may be improved. Thus, the precision with which discs are written to may be improved. Further, costs may be lowered since the area of the semiconductor may be reduced.

DESCRIPTION OF SYMBOLS

52 Detector
53 Signal processing circuit
101 Semiconductor laser
104 Polarizing beam splitter
105 Quarter-wave plate 106 Multi-region diffraction grating
404 Objective lens
501 Multi-layer disc
551-561 Sensing region
811 Reflection light optical spot
841 Optical spot of reflection light from adjacent layer
863 Stray light

What is claimed is:

1. An optical pickup device comprising:
   a laser light source;
   an irradiation light focusing optical system that focuses a laser beam from the laser light source on one selected recording layer of a multi-layer optical information storage medium; and
   a detection optical system that detects reflection light reflected from the selected recording layer of the multi-layer optical information storage medium;
   wherein the detection optical system comprises: a detection lens; a semiconductor detector comprising a plurality of sensing regions; and a multi-region diffraction grating that is divided into a plurality of regions and located between the detection lens and the semiconductor detector;
   wherein an irradiation position, on the semiconductor detector, of a diffracted light beam from, of the plurality of regions of the multi-region diffraction grating, a center region including an optical axis is further from the optical axis than an irradiation position, on the semiconductor detector, of a diffracted light beam from another divided region;
   wherein the center region of the multi-region diffraction grating is divided into a first region and a second region by a straight line gassing through the optical axis;
   wherein the number of diffracted light beams from the first region and the second region is one each; and
   wherein diffraction directions of the first region and the second region are defined in such a manner that diffracted light beams of, among stray light from recording layers other than the selected recording layer of the multi-layer optical information storage medium, stray light that travels through the first region and the second region and becomes largest in shape on the semiconductor detector would be of a shape whose protruding part faces the opposite direction to the optical axis on the semiconductor detector.

2. An optical pickup device according to claim 1, wherein
   all focal points of the stray light are located on the semiconductor detector-side of the multi-region diffraction grating,
   the direction of the diffracted light beam from the first region and the direction of the diffracted light beam from the second region are directions that pass through the optical axis and intersect with each other, and
   stray light that travels through the first region and the second region does not irradiate, on the semiconductor detector, a sensing region other than a sensing region that detects reflection light from the selected recording layer that has traveled through the first region and the second region.

3. An optical pickup device according to claim 1, wherein
   stray light having a focal position on the detection lens-side of the multi-region diffraction grating becomes stray light of the largest shape on the semiconductor detector after traveling through the first region and the second region,
   the direction of the diffracted light beam from the first region and the direction of the diffracted light beam from the second region are directions that travel away from the regions of each other without passing through the optical axis, and
   stray light that travels through the first region and the second region does not irradiate a sensing region other than a sensing region that detects reflection light from the selected recording layer that has traveled through the first region and the second region.

4. An optical pickup device according to claim 1, wherein
   stray light having a focal position on the semiconductor detector-side of the multi-region diffraction grating becomes stray light of the largest shape on the semiconductor detector after traveling through the first region and the second region,
   the direction of the diffracted light beam from the first region and the direction of the diffracted light beam from the second region are directions that pass through the optical axis and intersect with each other, and
   stray light that travels through the first region and the second region does not irradiate a sensing region other than a sensing region that detects reflection light from the selected recording layer that has traveled through the first region and the second region.

5. An optical pickup device according to claim 1, wherein the direction of the division line of the first region and the second region coincides with a tangential direction or a radial direction.

6. An optical pickup device according to claim 1, wherein a focal position of the stray light and a position of the multi-region diffraction grating do not coincide with each other.

7. An information reading method comprising:
   a step of focusing read-out light on one selected recording layer of a multi-layer optical information storage medium;
   a step of generating a plurality of diffracted light beams by passing reflection light reflected from the selected recording layer through a multi-region diffraction grating that is divided into a plurality of regions and of detecting the plurality of diffracted light beams with a semiconductor detector comprising a plurality of sensing regions;
   a step of generating a focus error signal and a tracking error signal by computing detection signals of diffracted light beams that have passed through regions other than a center region of the multi-region diffraction grating;
   a step of performing focus control using the focus error signal and of performing tracking control using the tracking error signal; and
   a step of generating an RF signal by computing detection signals including a diffracted light beam that has passed through the center region of the multi-region diffraction grating, wherein
   a diffraction angle from, among the plurality of regions of the multi-region diffraction grating, the center region including an optical axis is greater than a diffraction angle from another divided region,
   the center region is divided into a first region and a second region by a straight line passing through the optical axis,
   the number of diffracted light beams from the first region and the second region is one each, and
   diffraction directions of the first region and the second region are defined in such a manner that a diffracted light beam of, among stray light from recording layers other than the selected recording layer, stray light that passes through the first region and the second region and whose shape becomes largest on the semiconductor detector would be of a shape whose protruding part faces the opposite direction to the optical axis on the semiconductor detector.

8. An information reading method according to claim 7, wherein, depending on the selection of the recording layer, a focal spot, on the multi-region diffraction grating, of stray light that travels through the first region and the second region and becomes largest in shape on the semiconductor detector is included in the center region.

* * * * *